United States Patent [19]

Tam

[11] Patent Number: 5,033,842
[45] Date of Patent: Jul. 23, 1991

[54] EPISCOPIC PROJECTOR

[76] Inventor: Kam T. Tam, Box 3135, San Jose, Calif. 95055

[21] Appl. No.: 479,377

[22] Filed: Feb. 13, 1990

[51] Int. Cl.⁵ .................... G03B 21/08; G03B 21/30
[52] U.S. Cl. .................................... 353/66; 353/65; 353/64; 353/99; 353/119; 353/DIG. 4; 353/97; 353/63
[58] Field of Search ................... 353/66, 65, 64, 63, 353/119, 122, 67, DIG. 4, 97, 37, 98, 99

[56] References Cited

U.S. PATENT DOCUMENTS

| | | | |
|---|---|---|---|
| 2,283,268 | 5/1942 | Kreinin | 353/64 |
| 3,489,494 | 1/1970 | Snider, Sr. | 353/67 |
| 3,512,883 | 5/1970 | Noble | 353/64 |
| 3,619,048 | 11/1971 | Engert et al. | 353/61 |
| 3,915,567 | 10/1975 | Altman | 353/44 |
| 3,920,323 | 11/1975 | Nishitani | 353/61 |
| 4,120,574 | 10/1978 | Hofmann et al. | 353/119 |
| 4,343,538 | 10/1982 | Astero | 353/64 |
| 4,380,380 | 4/1983 | Back | 353/66 |
| 4,468,105 | 8/1984 | Montgomery | 353/66 |
| 4,523,823 | 6/1985 | Roope | 353/97 |
| 4,565,430 | 1/1986 | Grunwald | 353/61 |
| 4,588,271 | 5/1987 | Emura | 353/66 |
| 4,636,050 | 1/1987 | Tohata et al. | 353/66 |
| 4,696,557 | 9/1987 | Tomizuka | 353/66 |
| 4,776,688 | 10/1988 | Ushiro et al. | 353/119 |
| 4,811,110 | 3/1989 | Ohmura et al. | 353/119 |
| 4,921,343 | 5/1990 | Ushiro et al. | 353/119 |
| 4,971,436 | 11/1990 | Aoki et al. | 353/37 |

FOREIGN PATENT DOCUMENTS 2152233  7/1985  United Kingdom ............ 353/67

Primary Examiner—William A. Cuchlinski, Jr.
Assistant Examiner—William C. Dowling

[57] ABSTRACT

An apparatus and method for projecting optical images from opaque or transparent objects onto a remote viewing screen includes a plane mirror combination and a reflective projection means. The plane mirror combination comprises an image inverting plane mirror and an image reversing plane mirror. The image inverting plane mirror is positioned angularly over the illuminated object and converts the upright and nonreversed object image into an inverted and reversed image. Disposed close by the image inverting plane mirror is the reflective projection means which comprises a parabolic concave mirror the parabolic concave mirror captures the inverted and reversed image and projects it onto the image reversing plane mirror near by as an enlarged, upright and reversed image. In return, the image reversing plane mirror reflects the enlarged, upright and reversed image onto the remote viewing screen as an enlarged, upright and nonreversed real image. The apparatus and method is convenient to operate and with the objects to be projected accessible to the operator but without the irritation of stray light glares affecting the operator's eyesight. The apparatus and method is also capable of projecting high quality images without resorting to the inclusion of complicated optics.

23 Claims, 6 Drawing Sheets

EPISCOPIC PROJECTOR

BACKGROUND OF THE INVENTION

1. Field of the Invention

The present invention relates to an optical projection apparatus and method. In particular, this invention is related to image projection of opaque materials or transparencies onto a remote screen.

2. Description of the Related Art

In business or educational presentations, the commonly used overhead projectors are very useful tools. However, these projectors only accept transparencies. To project a handwritten or a printed document which are normally based on opaque materials, the document has to be converted into transparent slides through a special copying machine before projection. These converting steps are inconvenient. Moreover, converting printed materials with colors into transparencies is an expensive process. There is a definite need for optical projectors that project optical images from opaque materials. Projectors that project opaque materials are called episcopes, as differentiated from diascopes in which the objects to be projected need to be optically transparent for light rays to pass through. There are episcopes invented in the past but with certain limitations. Chief among all is that materials to be projected are mostly unaccessible to the operator. Examples of these types are U.S. Pat. Nos. 4,468,105 to Montgomery, Aug. 28, 1984; 4,343,538 to Astero Aug. 10, 1982; 3,920,323 to Nishitani, Nov. 18, 1975; 4,380,380 to Back, Apr. 19, 1983; and 3,619,048 to Engert et al., Nov. 9, 1971. With these episcopes, the object document to be projected must be fully enclosed. The reason is because there is a lack of an equivalent light concentration means such as a Fresnel lens used in the diascopic projectors to converge light rays from the object to the projection lens. Thus, light rays have to be confined within the episcopic enclosure from leaking out and a strong illumination within the enclosure is necessary to project a satisfactory screen image. This poses inconveniency for the operator to write on the document during presentations. There are episcopes with the document to be presented accessible to the operator. Examples are U.S. Pat. Nos. 4,565,430 to Grunwald, Jan. 21, 1986; and 3,512,883 to Noble, May 19, 1970. However, without a light concentration means in these episcopes as mentioned earlier, the illumination light source has to be extraordinary intense to achieve equivalent results. The strong light illumination on the object would cause discomfort to the operator's eyesight. Moreover, with the object to be projected under intense light and being exposed, unshielded light rays could transmit onto the remote screen and degrade the contrast of the projected image.

Part of the reasons for all the aforementioned inconveniences is because episcopes invented in the past almost all use lenses as light processing and magnifying elements. Ground lenses resulted from the manufacturing process are normally spherical in surface curvatures. Too large a lens aperture with a spherical surface curvature and a low f-number would incur all the optical defects such as spherical aberration and coma. It is for this reason that there is usually a limited aperture size associated with lenses which restrict the light utilization efficiency when lenses are used in episcopes. As a consequence, the majority of the light energy is not efficiently projected but instead is lost inside the enclosures of the episcope.

Another disadvantage related to prior arts that use lenses is another undesirable optical effect called chromatic aberration which occurs even for a lens with small aperture and a high f-number. Chromatic aberration is mostly eminent when a white light ray passes through a lens built of a homogenous material. The primary colors made up of the white light ray focus at different locations, because different colors assume different refractive indexes through the homogeneous lens material. The result is a sharp image for one color but blurred for the other colors. Combination lenses constructed with materials of different refractive indexes can be used to reduce the chromatic aberration effect, but that usually involves very expensive achromatic lens systems especially if a large aperture is required.

It is the object of the present invention to provide an optical projecting apparatus that projects not only transparencies but also opaque materials, without going through the inconvenient steps of transparent slide conversion, but still maintains all the conveniences of the conventional overhead projector.

It is another object of the present invention to provide sufficient brightness and contrast for the projected image on the remote screen without resorting to excessive intense light source illumination inside the apparatus due to the efficient usage of the light source of the present invention. As a consequence, the object under projection would be accessible to the operator but avoiding the shortfall of causing discomforts to the operator's eyesight from the intense light glares reflected by the exposed object. It also minimizes the spill-over of stray light rays reflected by the exposed object towards the remote screen and creates image contrast degradation.

It is a further object of the present invention to provide high quality images free of chromatic aberrations and other optical defects such as spherical aberration and coma without resorting to the inclusion of complicated optics.

It is still a further object of the present invention to furnish a projecting apparatus which is compact in physical size with the most efficient use of projection spaces due to the inherent foldable optical path of the present invention.

SUMMARY OF THE INVENTION

The present invention is an apparatus and method of projecting optical images of opaque objects onto a remote viewing screen. The present invention is not only limited to projecting handwritten pages or printed materials. Three-dimensional objects with relatively flat features such as biological or geological specimens, coins or small articles can also be projected. In addition, the apparatus can also be optionally equipped to project transparencies.

In a conventional diascopic projector, such as the commonly used overhead transparency projector, light energies are efficiently utilized. Generally, a light source comes from within a housing. On the top of the housing is a light concentration means such as a Fresnel lens onto which the transparency is laid on. A post extends above the housing and on the other end mounted a projection lens with a reflective plane mirror. The light rays after leaving the Fresnel lens and passing through the transparency are controllably concentrated into the projection lens, with only a minimum amount of light rays wasted. However, in episcopic projection systems, no such light concentration means such as the Fresnel lens can yet be available. To lay a Fresnel lens on the top of the object to be projected for light concentration would mask out the object itself. Thus episcopic projectors in prior arts have to fully enclose the object and illuminate the object with intense light to achieve satisfactory results. Any attempt to expose the object would result in intense light glares reflected from the object to the operator and cause irritations to the operator's eyesight. Moreover, excessive light rays could spill over onto the remote screen and wash out the image contrast.

In the present invention, mirrors are used instead of lenses. A good quality mirror can normally reflect slightly more than 90% of the incident light. The same holds true for a lens built of a high-grade material which also transmits slightly more than 90% of light. However, for the same level of manufacturing cost, mirrors can be built with relatively much larger surface areas than lenses. Illustration of manufacturing of optical components is beyond the scope of the present invention. However, the following comparisons are highlighted. To project equal quality images, in the high performance end, metallic parabolic mirrors such as built with Aluminum are much lower in cost than the corresponding lens counterparts such as an achromatic doublet of the same size. In the low performance end, any moldable plastic material with a smooth surface and a reflective coating can be used for mirrors. As for lenses, transparent plastic such as acrylic and polystyrene need to be used. Lenses with large areas require large thickness for robustness but thick plastic lenses pose difficulty in the fabrication process due to the fact that different sections within a lens profile with different thicknesses require different cooling cycles for solidification after the injection molding step. The resultant effect is a lens with a distorted curvature. Special technique needs to be applied which adds extra steps of manufacturing and substantially increases its cost.

With large surface areas for light processing, a large solid angle can be cast onto the mirrors from the object and light rays can thus be more efficiently collected with loss reduced to a minimum. As a consequence, the intensity of the illuminating light source can be reduced comparatively and the projected images with good brightness and contrast could still be maintained.

Another advantage associated with light being processed by mirrors is from a basic law of Physical Optics. The angle of incident light towards a mirror surface is always equal to the angle of reflection and is independent of color. Thus, chromatic aberration is virtually nonexistent when color light is processed through mirrors.

The present invention involves mirrors as light processing elements. In this specification and in the appended claims, the word "mirror" is a generic term construed to include both first-surface and second-surface mirrors, it can also be built of any compositions, including materials such as glass, plastic or metal, polished enough with a reflective surface to reflect optical images. The term "confronting" when used between mirrors means that the reflecting surfaces of the mirrors are directing onto each other allowing an unobstructive communication of light rays.

In the present invention, basically, the image reflected from the object from the light rays illuminated by the light source is being inverted and reversed by a plane mirror before projection. A parabolic concave mirror is placed confrontingly with the image inverting plane mirror to capture the inverted and reversed image and reflects it back as an enlarged, upright and reversed image. Another plane mirror disposed adjacently close by the parabolic concave mirror reverses the enlarged, upright and reversed image into an enlarged upright and nonreversed real image and reflects the real image onto a remote viewing screen. The placement of the image reversing plane mirror is optionally designed to be rotatable such that images can be projected either sidewardly or rearwardly with respect to the apparatus. The parabolic concave mirror can also be replaced by a Fresnel concave mirror. In this specification and in the appended claims, the term "Fresnel concave mirror" means a mirror which is constructed by a multiple number of concentric reflecting and finely spaced mirror rings all disposed on a common planar surface and each mirror ring converges the incoming parallel light rays perpendicular to the planar surface onto a common focus in the same manner as a conventional concave mirror. The present invention is further designed to be optionally for transparency projection by an addition of another Fresnel concave mirror overlaying on the base of the apparatus.

With mirrors as light processing elements, the optical path inside the apparatus can be designed to be foldable with the most efficient use of projection spaces. Thus a compact portable model is possible which is convenient for storage and for transportation.

These and other advantages, features, and objects of the present invention will be apparent from the following description in conjunction with the drawings.

DETAILED DESCRIPTION OF THE PREFERRED EMBODIMENTS

Figure 1:
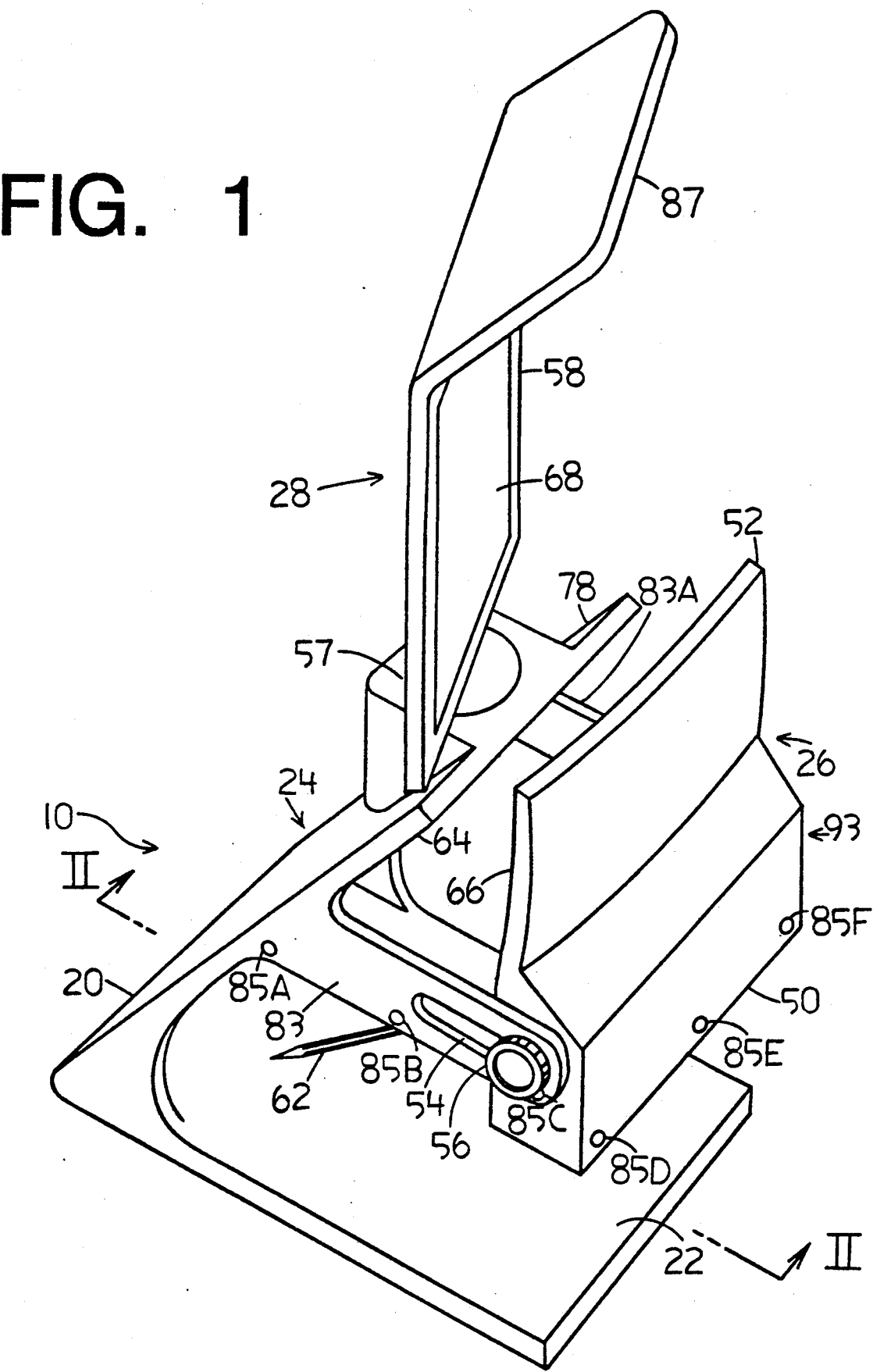
FIG. 1 is a perspective view of one embodiment of the present invention with a rotatable image reversion means enabling the apparatus to project images sidewardly and rearwardly.
Figure 2:
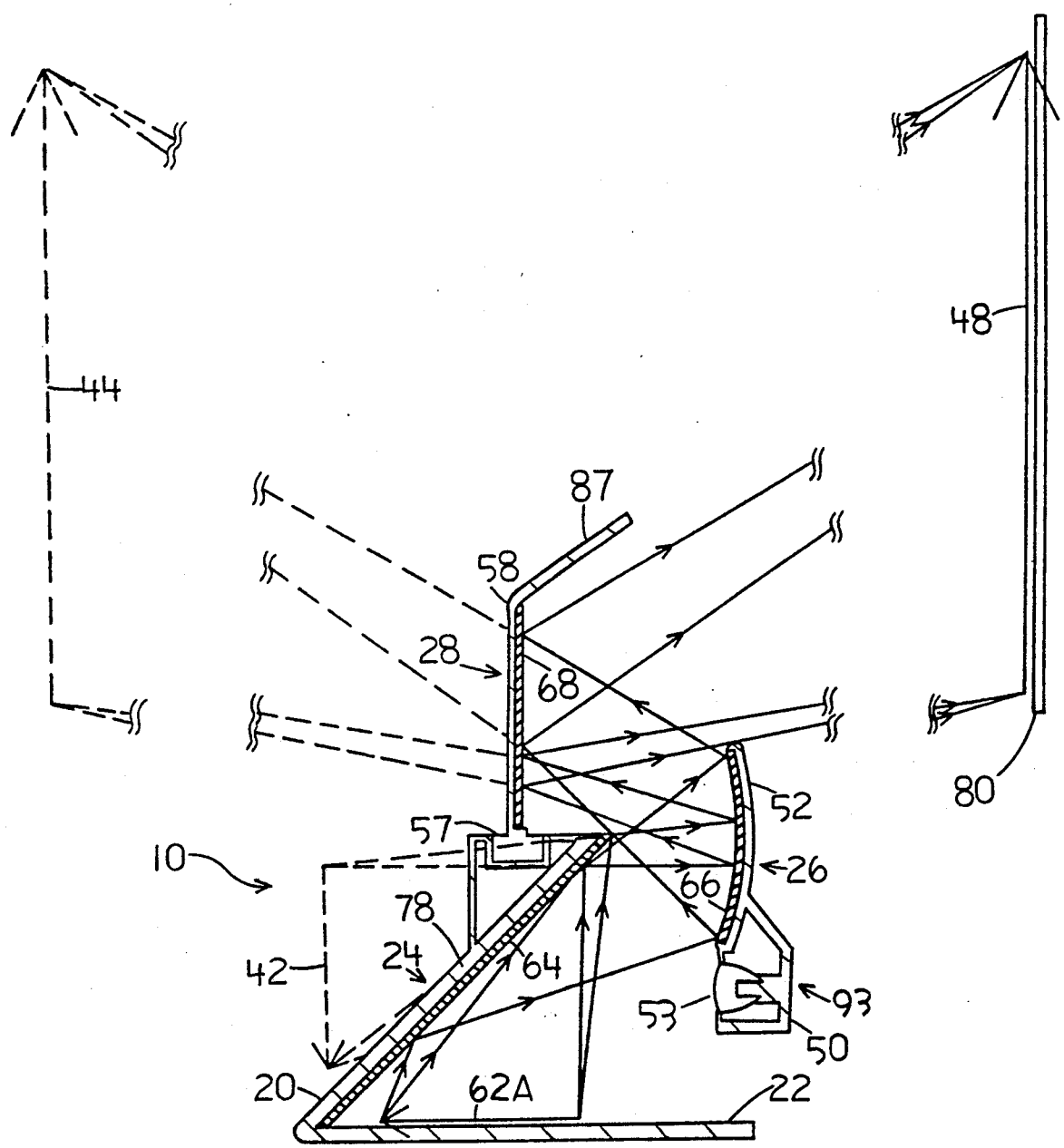
FIG. 2 is an elevational view taken along the line II—II of FIG. 1 illustrating the paths of light rays travelling from the object to the image on the remote screen of the present invention with an arrow sign being used as an object and its associated images.
Figure 3:
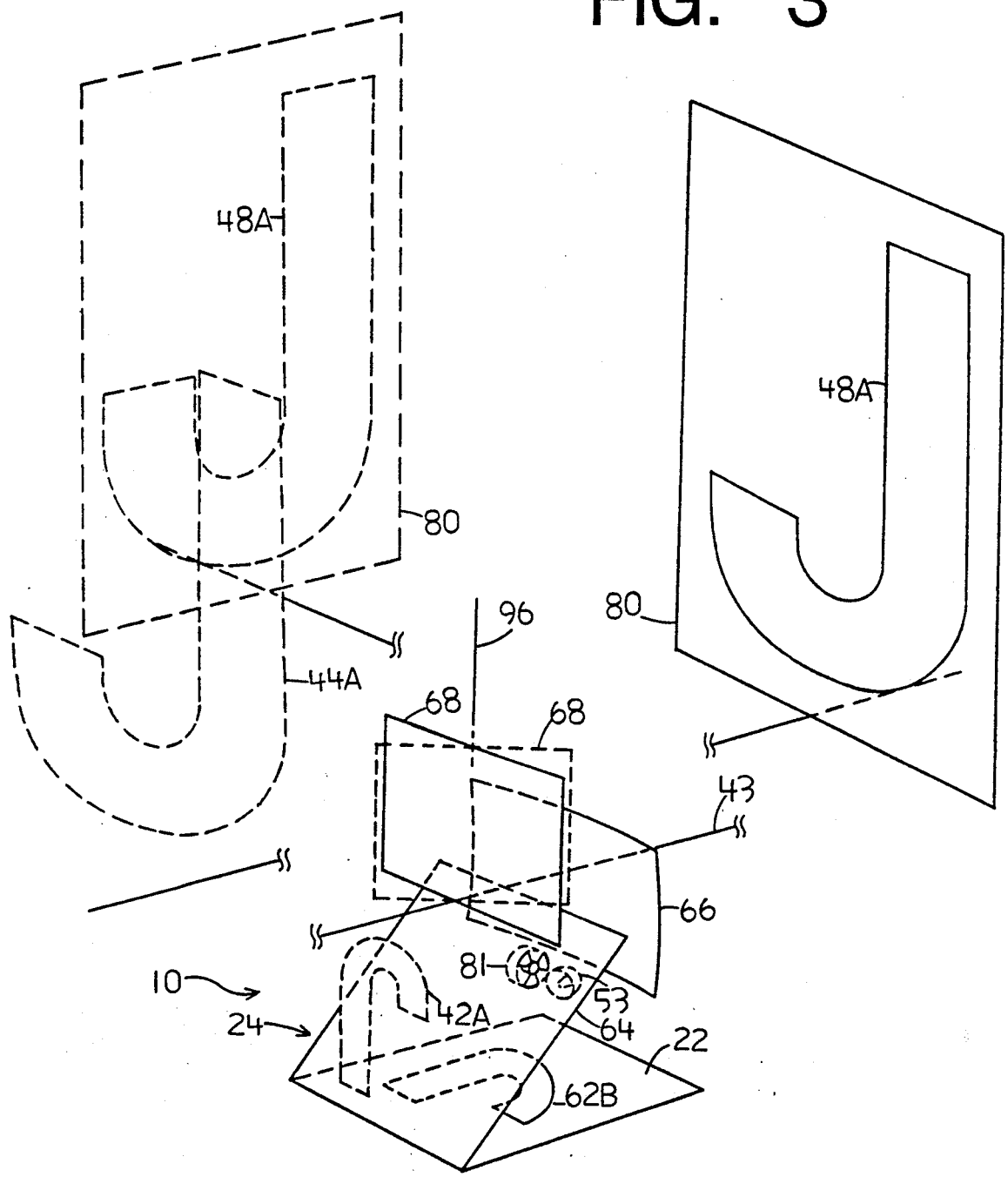
FIG. 3 shows a perspective view of the relative positions and orientations of the images among mirrors and the remote screen with the uppercase alphabet "J" being used as an object and its associated images.

Referring now to FIG. 1, FIG. 2 and FIG. 3, the apparatus 10 includes a base 22 upon which the object to be projected is placed. In FIG. 1, FIG. 2 and FIG. 3, different objects 62, 62A and 62B, respectively, are shown located on base 22. Above base 22 is an image inversion means 24 which comprises a mirror holder 78 and an image inverting plane mirror 64 with the reflecting surface angularly facing the object 62 at an included angle of 45 degrees with the top surface of base 22 in the preferred embodiments. At a predetermined distance away from the image inverting mirror 64 is the reflective focusing means 26. In the preferred embodiment, the reflective focusing means 26 comprises a parabolic concave mirror 66 having a focal length of approximately 18 inches and mounted within a concave mirror holder 52 attached to the light source housing 50. The optical axis 43 (FIG. 3) of the parabolic concave mirror 66 is located above the image inversion means 24. Light source housing 50 is a part of the light source means 93 which also comprises a light source 53 and an optional cooling fan 81 (FIG. 3) for circulating cooling air over said light source. Light source housing 50 is slidable within guide-slots 54 (only one of which is visible) in linkage arms 83 and 83A located on both sides of frame 20 and the position of light source housing 50 can further be locked by tightening knobs 56 (only one of which is visible). Above the image inverting mirror 64 and located on the top part of frame 20 is an image reversion means 28 which comprises an image reversing plane mirror 68 encased within a mirror holder 58 with a light shade 87 extending out of the top part of the mirror holder 58. Image reversion means 28 can be designed to be rotatable about round base 57 within the top section of the frame 20. The axis of rotation 96 (FIG. 3) for the image reversion means 28 is generally perpendicular to the optical axis 43 of the reflective focusing means 26. Shielding attachment means, such as peelable fabric locks 85A to 85I are located around the lower edges of linkage arms 83 and 83A and light source housing 50, for attaching light-absorbing shielding fabrics to intercept stray light rays and preventing them from entering onto the remote screen 80 during a projection arrangement when apparatus 10 is disposed at a close distance with the remote screen 80 and with light source 52 emitting intense light.

Notice that parabolic concave mirror 66 can be replaced by a Fresnel concave mirror having the same focal length. For more light concentration during transparency projection, base 22 can be replaced by a different base with another Fresnel concave mirror attached on its top surface.

When the apparatus is powered on, light source 52 emits light rays horizontally towards the image inversion means 24, striking into the image inverting plane mirror 64 and then reflected downwardly and illuminating object 62A as shown in FIG. 2. The light rays reflected by object 62A reenter back into the image inverting plane mirror 64. A first virtual image 42 (shown as 42A in FIG. 3) is formed with an orientation of being inverted and reversed as depicted in FIG.2 and FIG. 3. Virtual image 42 establishes the basis for projection. Light rays emitting from virtual image 42 enter into the parabolic concave mirror 66. In return, the light rays are reflected back but travelling in an opposite direction as a second virtual image 44 (shown as 44A in FIG.3) having an orientation of being enlarged, upright and reversed as depicted in FIG. 2 and FIG. 3. The relationship of the distance between parabolic mirror 66, first virtual image 42 and second virtual 44 are governed by the following equation in Physical Optics:

$$\frac{1}{f} = \frac{1}{o} + \frac{1}{i}$$

where f is the focal length of the concave parabolic mirror 66; o is the distance between the first virtual image 42 and the vertex of the parabolic mirror 66; and i is the distance between the second virtual image 44 and the vertex of the parabolic concave mirror 66. With the image reversing mirror 68 in the optical path between the virtual image 44 and the parabolic mirror 66, second virtual image 44 is reflected and redirected onto the remote screen 80 as an enlarged, upright and non-reversed real image 48 (shown as 48A in FIG. 3) as depicted in FIG. 2 and FIG. 3. The magnification of projection is also given by the equation:

$$m = i/o$$

where m is the linear magnification of size of the real projected image 48 with respect to the size of the object 62, and i and o are exactly the same as previously defined. Notice that the magnification of projection can be adjusted by changing the distance between the apparatus 10 and the remote screen 80 and by modifying the distance between parabolic concave mirror 66 slidably along the guide-slots 54.

Also notice that real image 48 can be projected at different angles, such as sidewardly or rearwardly with respect to the apparatus by simply rotating the image reversion means 28 about a generally vertical axis. As shown in FIG. 3, the combination of the image inverting mirror 68, real image 48A, and remote screen 80 drawn with solid lines is when the apparatus 10 is projecting the real image 48A rearwardly. The combination with the corresponding elements drawn with dotted-lines is when the apparatus 10 is projecting the real image 48A sidewardly. The scan angle of projection for the apparatus 10 can extend a wide span of approximately 180 degrees.

Figure 4:
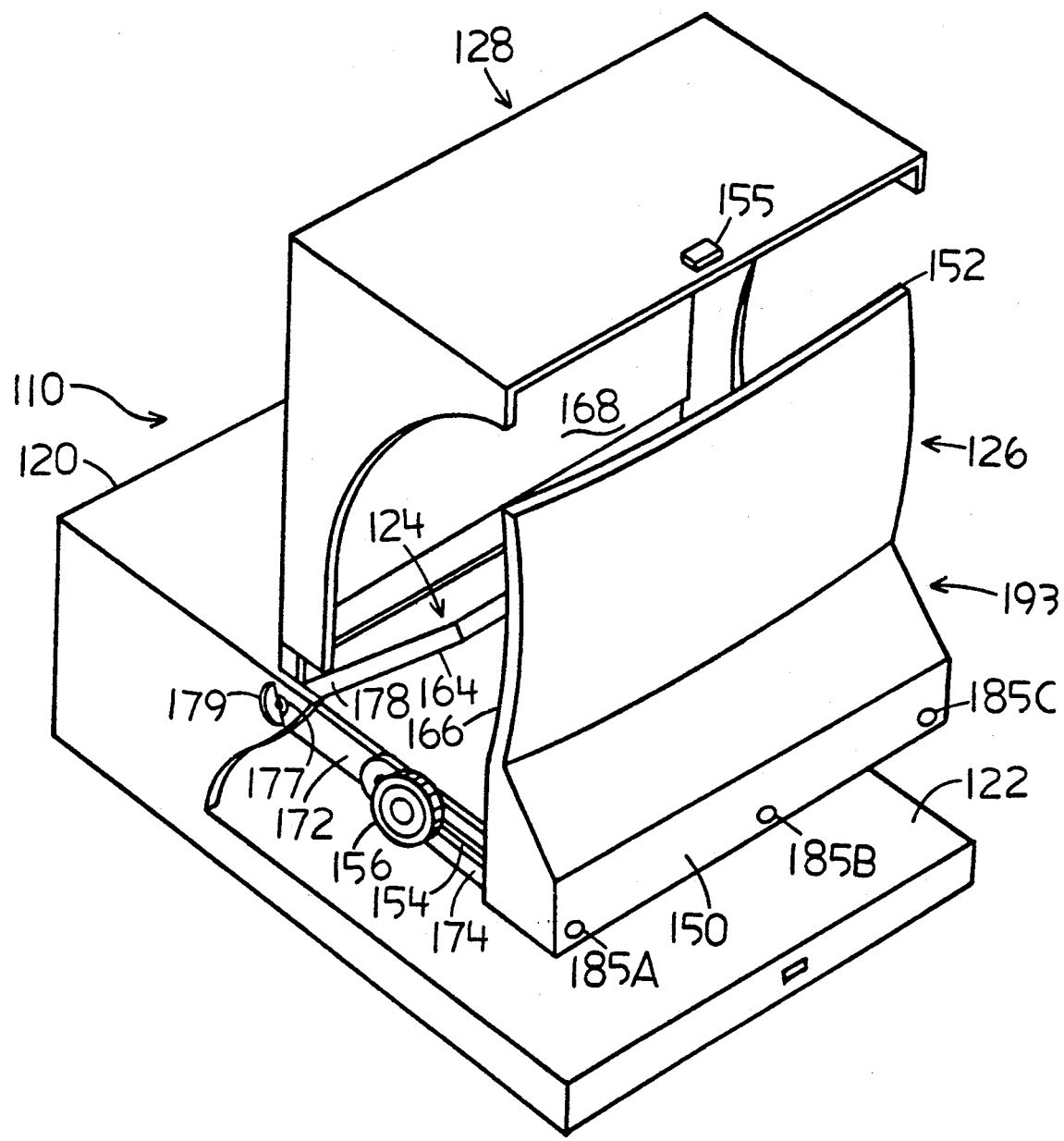
FIG. 4 is a perspective view of another embodiment of the present invention characterized by a close position and an open position.

FIG. 4 shows another preferred embodiment of the present invention having a closed position and an open position. Frame body 120 includes a base 122 upon which objects to be projected are placed on. The frame body 120 resembles a partially open box with one end being closed. A frame cover member which also serves as the image reversion means 128 is hingedly attached to frame body 120. The image reversing plane mirror 168 is mounted within the image reversion means 128. On the front and bottom edge of the image reversion means 128 is a frontal locking mechanism such as a case lock 155 which allows the image reversion means 128 to be lockingly secured with the frame body 120 when the apparatus 110 is in its closed position. Two extended arms 172 (only one of them shown) fixed on the sides and within the frame body 120 and extend in a direction parallel to the base 122. The reflective projection means 126 comprises a concave mirror holder 152 which encases the parabolic concave mirror 166. The reflective projection means 126 is also fixedly attached to the light source housing 150 which is a part of the light source means 193. Two swing arms 174 (only one of which is visible) with guide-slots 154 (only one of which is visible) therein are rigidly attached to the two sides of the light source housing 150. The assembly with the reflective projection means 126 and the light source housing 150 are connected to the frame body 120 via the two swing arms 174, with threaded studs protruding from the two ends of the extending arms 172 (only one of which is visible) passing through the guide-slots 154 in the swing arms 174. Swing arms 174 can further be tightened onto the extended arms 172 by the tightening locking knobs 156 (only one of which is visible). A center plate member which also serves as the image inversion means 124 comprises a plane mirror holder 178 to which the image inverting plane mirror 164 is secured. The image inversion means 124 and the image reversion means 128 are connected hingedly in the frame through common hinge pins 177 (only one of which is shown) and secured by a central locking mechanism such as set keys 179 (only one of which is shown). Notice that the set keys can be replaced by another locking mechanism such that the change from the closed position to the open position or vice versa of the apparatus 110 can be automatic and with the movable parts lockingly secured. Light shielding attachment means, such as peelable fabric locks 185A to 185C, are located around the lower edge of light source housing 150 for attaching a light-shielding fabric to intercept stray light rays and prevent them from entering the remote viewing screen 80 during a projection arrangement.

When the apparatus 110 is ready for projection, image reversion means 128, which also serves as the frame cover member of the frame body 120, is lifted opened and erected approximately perpendicular to the base 122. The image inversion means 124 is then rotated angularly with respect to the base 122 about hinge pins 177 and tightened by set keys 179. The light source housing 150, which is lying flat inside the frame body 120 and with the swing arms 174 vertical to the base 122 during the closed position, is slid out and lifted up about the threaded studs in the extended arms 172 and above base 122 and held in place by loosely tightening the locking knobs 156. Once a sharp image is available on the remote screen, the position of the assembly with the light source housing 150 and the reflective projection means 126 can be locked by further tightening the locking knobs 156. To convert the apparatus 110 from the open position to the close position is the reverse of the aforementioned steps.

Figure 5A:
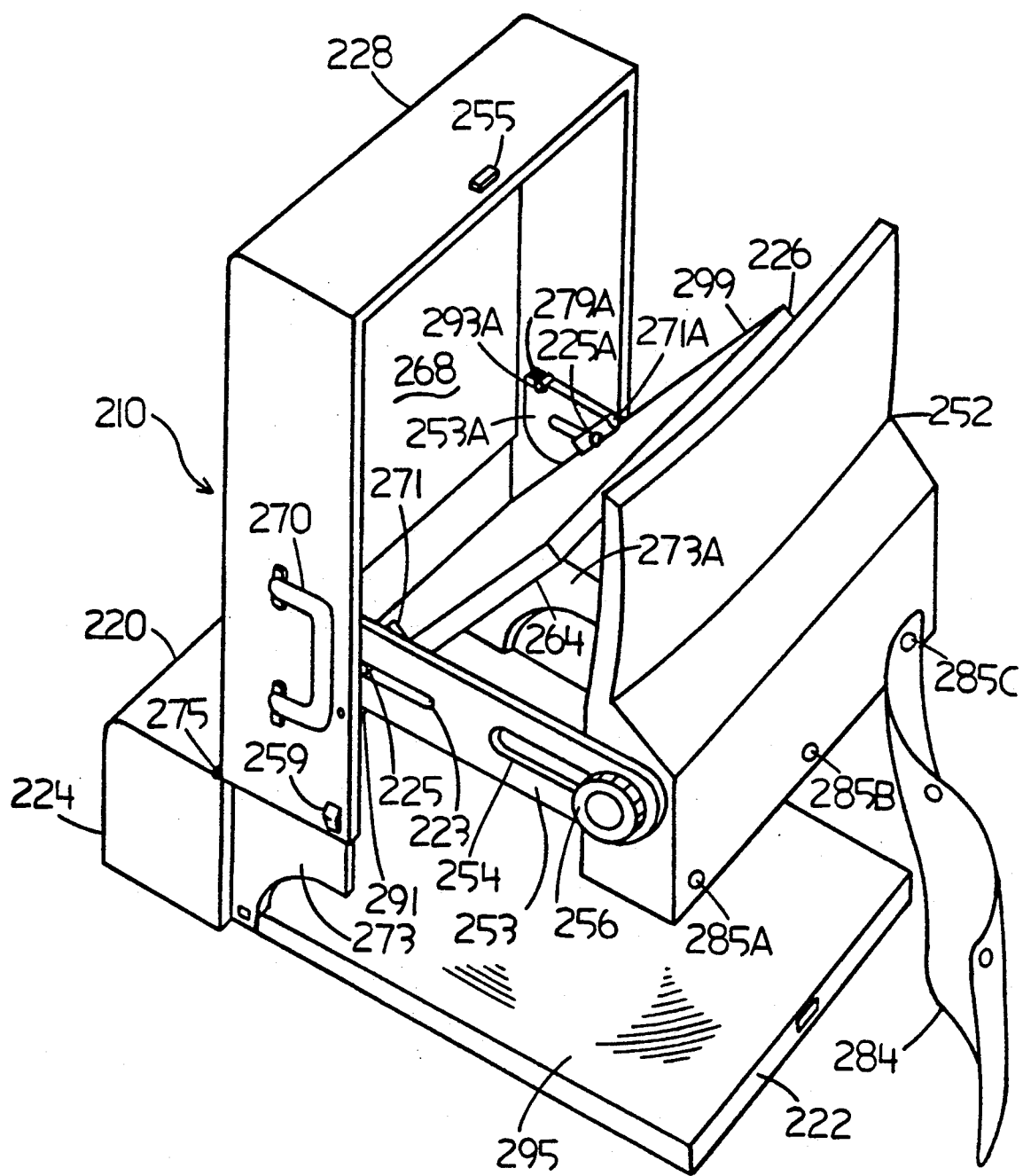
FIG. 5A is a perspective view of yet another embodiment of the present invention with a foldable feature in its operable mode position.
Figure 5B:
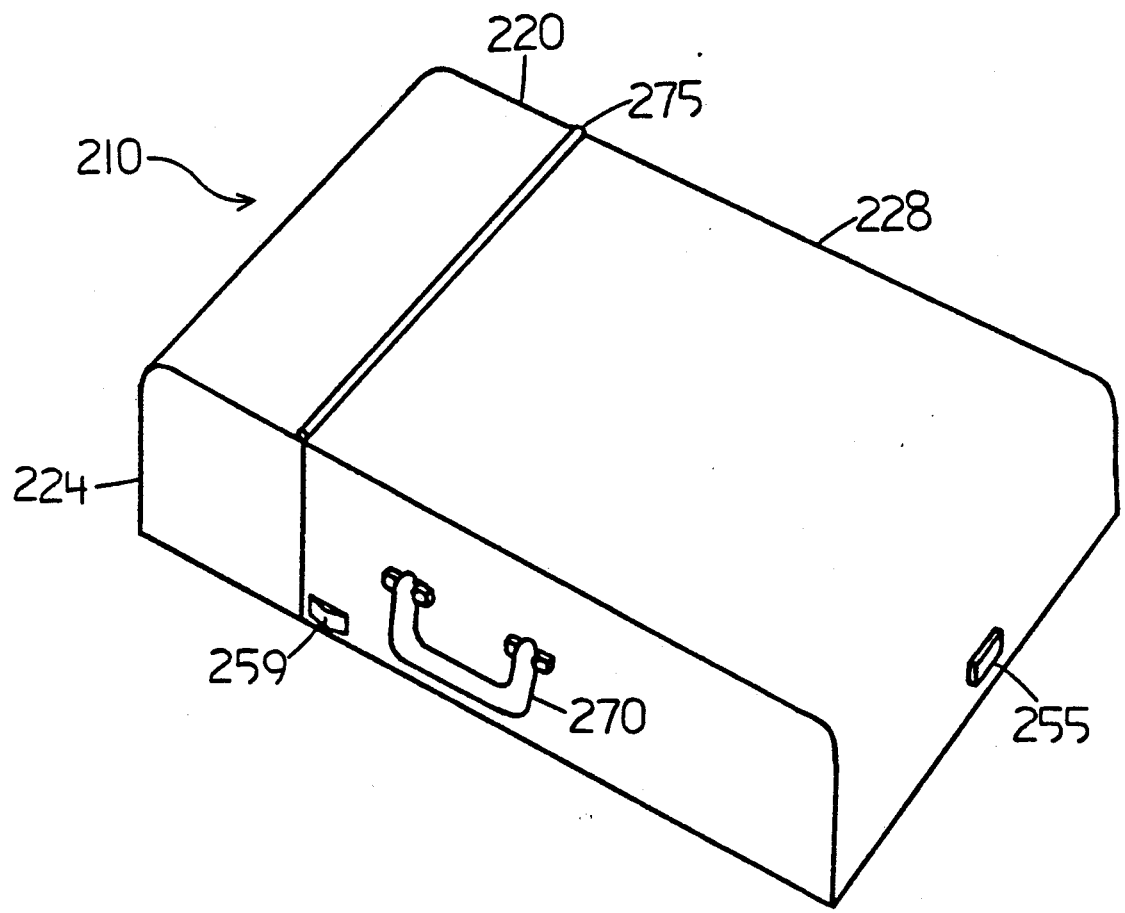
FIG. 5B is a perspective view of the embodiment depicted in FIG. 5A in its transportable mode position.

FIG. 5A and FIG. 5B show yet another embodiment which is foldable and is characterized by a transportable mode position and an operable mode position. A fixed housing portion 224 is provided with a base 222 affixed thereto. The image reversing mirror 268 is attached to the second movable portion 228 of the frame 220. The relatively movable portions 224 and 228 are connected together through case hinge 275. Case hinge 275 also passes through a first movable portion 299 which also carries image inversion means 226 with the image inverting plane mirror 264 fixedly mounted thereon. There are two flanges 271 and 271A with two rivets 225 and 225A on each of the flanges attached to the midsection of the side edges of the first movable portion 299. There are also two linkage arms 253 and 253A having two guide-slots 254 (only one of which is visible) formed within each of the arm bodies. In addition, two narrower slots serve as the locking slots 223 (only one of which is visible) through which the rivets 225 and 225A pass. Broader guide-slots 254 are provided at the other end of arms 253 upon which a third movable portion 252 is being slidably hingedly connected.

A first locking mechanism such as case lock 255 adapted in between the second movable portion 228 and the end of base 222 enables the apparatus 210 to be securely locked during the transportable mode position. A second locking mechanism such as supporting pieces 273 and 273A with case catches 259 (only one of which is visible), is installed to hold the fixed housing portion 224 and the second movable portion 228 at different positions in both the transportable mode position and the operable mode position. The second movable portion 228 is rested on the top edges of supporting pieces 273 and 273A by the pair of case catches 259 (only one of which is visible), whereby the second movable portion 228 can be in an open, upwardly extending position vertical to the base 222 during the operable mode position. Case catches 259 are locked into their respective receptacles in the fixed housing portion 224 when second movable portion 228 and fixed housing portion 224 are closed together during the transportable mode position. There is also a third locking mechanism installed within the interiors of the two sidewalls of the second movable portion 228. The third locking mechanism in this embodiment includes two stopping studs 279A (only one of which is visible), and two resilient resting pieces 291 (only one of which is visible) attached to the sidewalls of the second movable portion 228 as shown in FIG. 5A. There are two notches 293A (only one of which is visible) formed in one of the extremities of each of the linkage arms 253 and 253A. When the apparatus 210 is in its operable mode position, notches 293A are hooked into stopping studs 279A and with linkage arms 253 and 253A resting on resting pieces 291. The cooperation of the three locking mechanism allows all the movable portions to be held firmly relative to each other when the apparatus 210 is in its operable position.

For a projection arrangement with the apparatus 210 disposed at a close distance from the remote screen 80 and with the light source emitting intense light, a light shielding means, having a light-absorbing surface such as shielding fabric 284 attachable to attachment means such as peelable fabric locks 285A to 285C on the bottom of the third movable portion 252 is installed to intercept stray light rays preventing them from entering onto a remote screen.

For more light concentration during a transparency projection, a Fresnel concave mirror 295 can be overlain on the top surface of base 222 as shown in FIG. 5A.

When the apparatus is ready for projection, case lock 255 is unlocked and the second movable portion 228 is lifted upward and sustained in a vertical position by resting case catches 259 on the top edges of the support pieces 273. The first movable portion 299 is then flipped angularly with respect to the base 222 and at the same time the two linkage arms 253 and 253A are slidably extended out of the frame 220 and with the notches 293A at the ends of each arms hooked into stopping studs 279A. The two linkage arms 253 and 253A are then rested onto resilient resting pieces 291 for locking the position of the two linkage arms 253 and 253A in place. Third movable portion 252 is then slid out and rotated in a vertical position and loosely held in place by turning locking knobs 256. The apparatus 210 is then turned on. The focusing of the image on a remote screen is adjusted by sliding the third movable portion 252 along the guide-slots 254. Once a satisfactory image is available on the screen, the location of the third movable portion 252 is then securely tightened by the locking knobs 256.

Reversing the aforementioned steps converts the apparatus 210 from an operable mode position to a transportable mode position. A case handle 270 is hingedly attached to the frame 220 for the convenience of transporting the apparatus 210 as shown in FIG. 5B.

Finally, other changes are possible within the scope of the invention. For example the apparatus instead of being designed with open access to the object to be projected, can be designed as an enclosed apparatus.

It is also clear that the remote screen and the mirror elements can be placed together into one assembly as a compact projection system.

Furthermore, it is also apparent that the screens being used for projection do not have to be limited to the opaque and reflective type screens. Semi-transparent or translucent screen with the projection light rays coming from behind the screen and with the audience viewing in front of the screen is also practical. With this arrangement, the image reversing means can be eliminated and the audience viewing from the other side of the translucent screen automatically see images with the correct orientations.

While the present invention has been shown and described with reference to preferred embodiments thereof, it will be understood by those skilled in the art that these and other changes in form and detail may be made therein without departing from the scope and spirit of the invention.

I claim:

1. An apparatus for projecting an optical image from an object onto a remote viewing medium, comprising:
   a frame having a base adapted for support of an object to be projected;
   light source means disposed above said base to provide illumination of the object;
   image inversion means disposed angularly over said base such that light rays from said light source means are reflected by said image inversion means onto said object, and reflected light rays from said object enter into said image inversion means as an upright and nonreversed image and are reflected back by said image inversion means as an inverted and reversed image;
   reflective focusing means movably mounted on said frame with the optical axis of said reflective focusing means being disposed above said image inversion means, said reflective focusing means disposed at a predetermined distance from and confronting said image inversion means such that said inverted and reversed image reflected from said image inversion means enters into said reflective focusing means and is reflected back by said reflective focusing means as an enlarged, upright and reversed image; and
   image reversion means mounted on said frame above said image inversion means and confronting said reflective focusing means such that said enlarged, upright and reversed image enters into said image reversion means and is reflected back by said image reversion means as an enlarged, upright and nonreversed image for projection onto the remote viewing medium.

2. The projecting apparatus as set forth in claim 1 wherein said image reversion means is rotatably mounted on said frame with the axis of rotation generally perpendicular to the optical axis of said reflective focusing means, said image reversion means being rotatably confronting said reflective focusing means to enable said enlarged, upright and nonreversed image to be projected at different angles from said apparatus.

3. The projecting apparatus as set forth in claim 2 wherein said image reversion means further comprises a light shade disposed atop said image reversion means.

4. The projecting apparatus as set forth in claim 1 wherein said frame comprises;
   a frame body with said base mounted fixedly thereon;
   a frame cover member with said image reversion means mounted fixedly thereon;
   a center plate member with said image inversion means mounted fixedly thereon; and
   a light source housing with said reflective focusing means and said light source means mounted fixedly thereon, wherein said frame body, said center plate member and said frame cover member are pivotally engaged together, with said center plate member disposed in between said frame body and said frame cover member, said light source housing being slidably hingedly connected to said frame body and slidably engageable into a volume of space defined by said center plate member and said frame body therebetween such that when said light source housing is hingedly slid into said volume of space and when said frame cover member and said frame body are pivotally pressed inwardly together enables said apparatus to be in a closed position, and when said frame cover member is extended pivotally outwardly from said frame body, and when said light source housing is hingedly slid out of said volume of space enables said apparatus to be in an open position.

5. The projecting apparatus as set forth in claim 4 wherein said frame further comprises:
   a frontal locking mechanism coupled in between said frame cover member and said frame base, enabling said frame cover member and said frame body to be releasable lockingly engaged together when said apparatus is in said closed position; and
   a central locking mechanism adapted within said frame body, said central locking mechanism being coupled to said frame cover member, said center plate member and said light source housing enabling said frame cover member, said center plate member and said light source housing to be releasably lockingly engaged together within said frame body at a selected position when said apparatus is at said open position.

6. The projecting apparatus as set forth in claim 5 including common hinges engaging said frame cover member, said center plate member and said frame body, and wherein said central locking mechanism comprises at least one set key releasably lockingly coupled to said common hinges.

7. The projecting apparatus as set forth in claim 1 wherein said frame is characterized by an operable mode position and a transportable mode position, including:
   a fixed housing portion extending upwardly from said frame base;
   a first movable portion with said image inversion means mounted fixedly thereon;
   a second movable portion with said image reversion means mounted fixedly thereon; and
   a third movable portion with said reflective focusing means and said light source means mounted fixedly thereon, wherein said fixed housing portion, said first movable portion and said second movable portion are pivotally engaged with said fixed housing portion, with said first movable portion being disposed in between said fixed housing portion and said second movable portion, said third movable portion being slidably hingedly connected to said first movable portion and slidably engageable into a volume of space defined by said fixed housing portion and said first movable portion therebetween, such that when said third movable portion is hingedly slid into said volume of space and when said second movable portion is pivotally pressed inwardly together with respect to said fixed housing portion enables said apparatus to be in said transportable mode position, and when said second movable portion is extended pivotally outwardly from said fixed housing portion, and when said third movable portion is hingedly slid out of said volume of space enables said apparatus to be in said operable mode position.

8. The projecting apparatus as set forth in claim 7 further comprises:
   a first locking mechanism coupled in between said base and said second movable portion enabling said base and said second movable portion to be releasably lockingly engaged together when said apparatus is in said transportable mode position;
   a second locking mechanism coupled in between said fixed housing portion and said second movable portion and capable of supporting said second movable portion in a generally vertical position with respect to said base when said apparatus is in said operable mode position; and
   a third locking mechanism coupled to said first movable portion, said second movable portion and said third movable portion enabling said first movable portion, said second movable portion and said third movable portion to be releasably lockingly engaged together at a selected position when said apparatus is in said operable mode position.

9. The projecting apparatus as set forth in claim 8 wherein said second movable portion includes sidewalls with at least one stopping stud and with at least one resilient resting piece attached thereon, and wherein said third locking mechanism comprises at least one linkage arm capable of resting on said resilient resting piece and having a first end thereof releasably lockingly hingedly connected to said third movable portion, a midsection of said linkage arm being slidably hingedly connected to said first movable portion, and a second end of said linkage arm having at least one notch lockingly engageable with said stopping stud and supporting said first movable portion and said third movable portion at a selected position with respect to said fixed housing portion when said apparatus is in said operable mode position.

10. The projecting apparatus as set forth in claim 1 further comprises a Fresnel concave mirror disposed atop said base allowing transparencies to be projected to be placed thereon.

11. The projecting apparatus as set forth in claim 1 wherein said reflective focusing means comprises a concave mirror.

12. The projecting apparatus as set forth in claim 11 wherein said concave mirror is parabolic and has a focal length of substantially 18 inches.

13. The projecting apparatus as set forth in claim 1 wherein said reflective focusing means comprises a Fresnel concave mirror having a focal length of substantially 18 inches.

14. The projecting apparatus as set forth in claim 1 wherein said image inversion means comprises a plane mirror.

15. The projecting apparatus as set forth in claim 1 wherein said image reversion means comprises a plane mirror.

16. The projecting apparatus as set forth in claim 1 wherein said light source means further comprises a cooling fan for circulating cooling air over said light source.

17. The projecting apparatus as set forth in claim 1 wherein said apparatus further comprises light shielding means for intercepting stray light rays from entering onto said remote viewing medium, said light shielding means includes:
   a light shield having a light-absorbing surface; and
   attachment means for attaching said light shield onto said frame.

18. An apparatus for projecting an image of an object onto a remote viewing medium, comprising:
   a frame having a base having a top surface for allowing said object to be placed thereon;
   light source means coupled to said frame and above said object;
   image inversion means disposed adjacently and angularly above said top surface of said base such that the light rays from said light source means enter into said image inversion means and is reflected by said image inversion means onto said object, and the reflected light rays from said object enter into said image inversion means as an upright and non-reversed image and is reflected back by said image inversion means as an inverted and reversed image;
   reflective projection means slidably mounted on said frame and above said base with the optical axis of said reflective projection means being disposed above said image inversion means and substantially parallel to said base, said reflective projection means being disposed at a predetermined distance from and confronting said image inversion means such that said inverted and reversed image enters into said reflective projection means and is reflected back by said reflective projection means as an enlarged, upright and reversed image; and
   image reversion means coupled to said frame above said image inversion means and confronting said reflective projection means, whereby said enlarged, upright and reversed image from said reflective projection means enters into said image reversion means and is reflected back by said image reversion means as an enlarged, upright and non-reversed image onto the remote viewing medium.

19. The projecting apparatus as set forth in claim 18 wherein said reflective projection means comprises a parabolic concave mirror having a focal length in the range of substantially 12 inches to 30 inches.

20. The projecting apparatus as set forth in claim 18 wherein said reflective projection means comprises a Fresnel concave mirror having a focal length in the range of substantially 12 inches to 30 inches.

21. An apparatus for projecting an optical image from an object onto a remote viewing medium, comprising:
   a frame having a base for allowing said object to be placed thereon;
   light source means coupled to said frame and above said object;
   reflective projection means slidably mounted on said frame and above said base with the optical axis of said reflective projection means being disposed substantially parallel to said base; and
   a plane mirror system including an image inverting plane mirror and an image reversing plane mirror, with said image inverting plane mirror being disposed adjacently and angularly above the top surface of said base and confronting said reflective projection means such that light rays from said light source means enter into said image inverting plane mirror and are reflected by said image inverting plane mirror onto said object, and the reflected light rays from said object reenter into said image inverting plane mirror as an upright and nonreversed image and are reflected back by said image inverting plane mirror as an inverted and reversed image, said inverted and reversed image enters into said reflective projection means and is reflected by said reflective projection means as an enlarged, upright and reversed image, said image reversing plane mirror confronting said reflective projection means such that said enlarged, upright and reversed image enters into said image reversing plane mirror and is reflected back by said image reversing plane mirror as an enlarged, upright and nonreversed image for projection onto the remote viewing medium.

22. A method of projecting an optical image from an object onto a remote viewing medium comprising the steps of:

positioning an image inversion means angularly above said object;

directing light onto said image inversion means and illuminating said object by light reflected from said image inversion means such that the light rays reflected from said object reenter into said image inversion means as an upright and nonreversed image and are reflected back by said image inversion means as an inverted and reversed image;

projecting said inverted and reversed image into an enlarged, upright and reversed image by disposing a reflective focusing means at a predetermined distance from and confronting said image inversion means; and reversing said enlarged, upright and reversed image into an enlarged, upright and nonreversed image by disposing an image reversion means confronting said reflective focusing means such that said enlarged, upright and reversed image enters into said image reversion means and is reflected by said image reversion means as said enlarged, upright and nonreversed image onto the remote viewing medium.

23. The method of projecting an optical image from an object onto a remote viewing medium as set forth in claim 22 wherein said reversing said enlarged, upright and reversed image into said enlarged, upright and nonrevered image onto said remote viewing medium further comprises the step of disposing said image reversion means rotatably confronting said reflective focusing means with the axis of rotation generally perpendicular to the optical axis of said reflective focusing means, enabling said enlarged, upright and nonreversed image to be projected onto said remote viewing medium sidewardly and rearwardly.

* * * * *